United States Patent [19]

Kelly

[11] 4,293,005

[45] Oct. 6, 1981

[54] APPARATUS FOR FASTENING INSULATION TO A PIPE

[76] Inventor: James J. Kelly, 2310 Clearview La., Aston Township, Delaware County, Pa. 19014

[21] Appl. No.: 32,169

[22] Filed: Apr. 23, 1979

[51] Int. Cl.³ .............................. F16L 9/14; F16L 9/22
[52] U.S. Cl. .................................... 138/149; 138/147; 138/155; 138/161
[58] Field of Search ............... 138/147, 149, 155, 157, 138/158, 159, 167, 161

[56] References Cited

U.S. PATENT DOCUMENTS

| | | | |
|---|---|---|---|
| 1,832,143 | 11/1931 | Sitton | 138/147 X |
| 2,670,763 | 3/1954 | Hiss | 138/147 |
| 2,973,016 | 2/1961 | Holtsford | 138/147 |

Primary Examiner—James E. Bryant, III
Attorney, Agent, or Firm—Stuart E. Beck

[57] ABSTRACT

Method and apparatus for fastening insulation to a pipe which comprises an adjustable crib which is fastened both to the pipe and to the insulation. It prevents the insulation from shifting along the pipe. Additionally, a system for fastening insulation to a pipe is shown which comprises at least one of the cribs which is mounted both to the pipe and to the insulation. Further, a method is disclosed for fastening insulation to a pipe which comprises the steps of securing at least one of the adjustable cribs to a pipe and then connecting the insulation to the crib.

9 Claims, 5 Drawing Figures

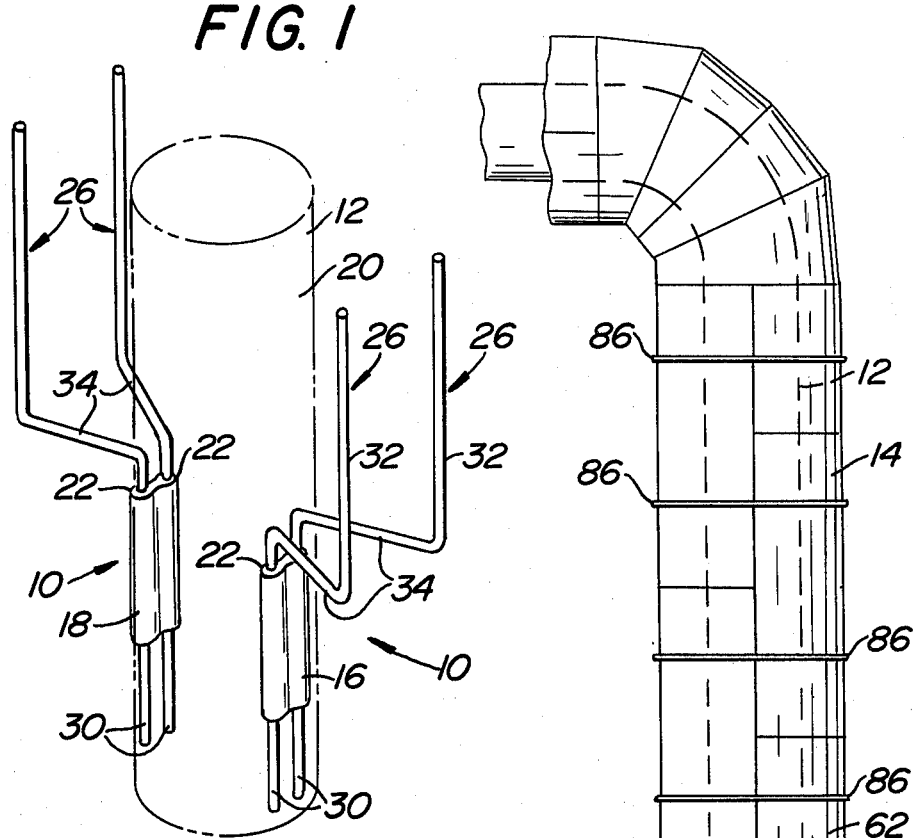
FIG. 1
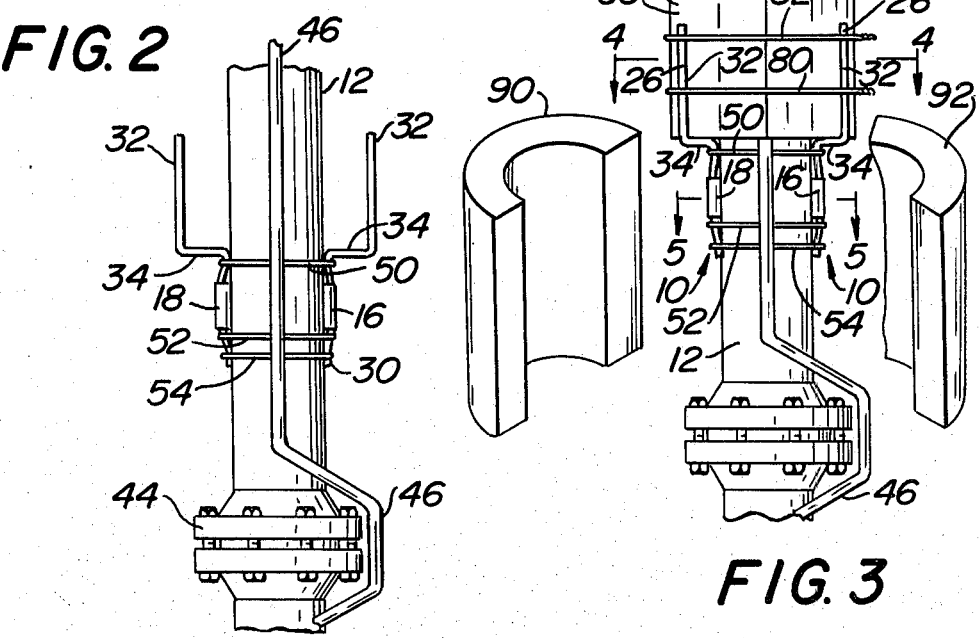
FIG. 2
FIG. 3

APPARATUS FOR FASTENING INSULATION TO A PIPE

This invention relates to an insulation fastening apparatus and method and more particularly to an insulation fastening apparatus and method which can be employed to secure insulation to a pipe.

In many processing plants such as paint manufacturing facilities, oil refineries, and other chemical processing facilities insulated pipe is a common occurrence. Typically, the pipe may be four or five inches in diameter and is surrounded by a layer of insulation which may be at least one or two inches thick. The insulation is usually placed on the pipe in sections starting near a flange or at the ground. Usually each section of insulation is about three or four feet long and is designed so that it fits half-way around the pipe. When the pipe reaches an elbow or "T" the insulation is cut so as to form truncated cylinders which are assembled in end-to-end relation until the turn is navigated. Usually the insulation is held on the pipe by wire or other material which is wrapped around an insulation cover and drawn tightly. The wire tends to bring the two insulation halves into close contact with each other and with the pipe surface.

However, in many installations, it is necessary to keep the material flowing through the pipe at an elevated temperature. This is accomplished by providing a small pipe, or tracer, along the outer surface of the larger pipe through which steam can be passed. When a pipe has a tracer, the insulation can not be brought into close contact with the pipe surface.

The technique for securing insulation to pipe is satisfactory for many installations. However, serious problems may occur when it is used in vertical pipe installations. This is because the insulation on vertical pipes has a tendency to slide along the pipe when it is unsupported. This problem becomes apparent when it becomes necessary to remove the lowermost sections of insulation from the pipe in order to add a gauge, a valve, or some other device.

The typical approach of most workmen when faced with a situation such as this is to remove the two lower sections of insulation to expose the pipe and to support the remaining sections with whatever is convenient in order to keep them from dropping over the exposed pipe. Typically, a long pole, board of the like is used.

This is a safety hazard since if the pole is not secure, or is knocked away inadvertantly the insulation will come crashing down on the person working on the pipe, with the likelihood of causing serious injury. Also there is the danger that the insulation will crack or break along the juncture of adjacent pieces to expose the pipe to the outside air. Further, the insulation will have to be repaired.

It is apparent that these problems can cause substantial expense and delay.

Accordingly, with the foregoing in mind this invention relates generally to an adjustable crib for securing a layer of insulation to the outer wall of a pipe. The adjustable crib comprises a plurality of elongated members with the first portion of each of said members being for lying along the outer wall of the pipe and a second portion of each of the members being for lying along the outer wall of the layer of insulation. The first and second portions of each of the rods are laterally offset with respect to each other and a third portion of each of the rods is disposed between the first and second portions to interconnect them.

Additionally, the invention relates to an insulation fastening system for a pipe surrounded by a layer of insulation which comprises at least one crib which includes a first rod with first and second portions where the first and second portions are laterally spaced from each other and which are connected by a third portion. The first portion is disposed adjacent to the outer wall of the pipe and the second portion is disposed adjacent to the outer wall of the layer of insulation. Means are provided for securing the first portion to the pipe and for securing the second portion to the outer wall of the layer of insulation.

Finally, the invention relates to a method of fastening insulation to a pipe which comprises the steps of providing at least one crib which includes at least one rod having first and second laterally spaced portions which are connected by a third portion and securing the crib to the pipe in the desired location on the pipe so that the second portion of the rod is disposed above the first portion. Placing the insulation on the pipe so that it is disposed above the third portion and so that it lies between the outer wall of the pipe and the second portion and then securing the second portion to the layer of insulation.

The invention can best be described by referring to the accompanying drawing where a presently preferred form of the invention is disclosed and wherein FIG. 1 is a perspective view, partially in phantom, of two cribs which are constructed in accordance with the invention.

FIG. 2 is a side elevation view of two cribs mounted on a pipe prior to the installation of the insulation.

FIG. 3 is a side elevation view of an insulation fastening assembly in accordance with the present invention.

Figure 4:
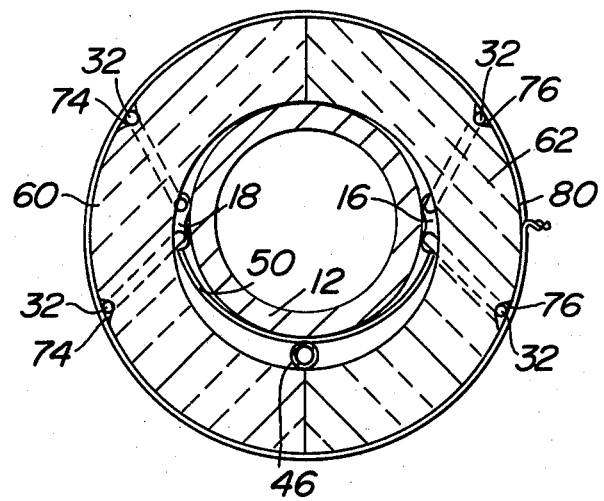
FIG. 4 is a sectional view taken along line 4—4 of FIG. 3.
Figure 5:
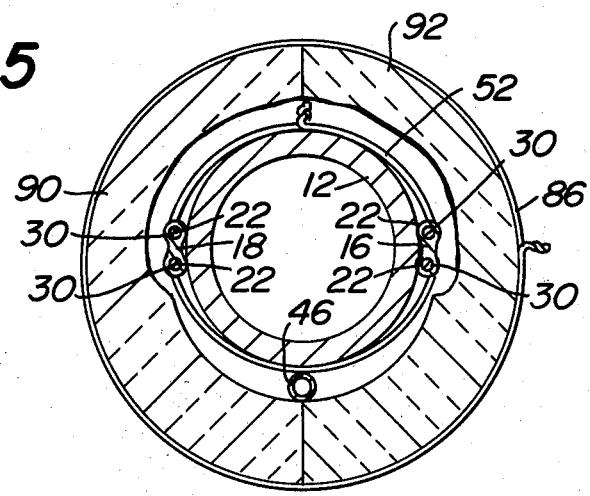
FIG. 5 is a sectional view taken along line 5—5 of FIG. 3.

Referring now to the drawing, two adjustable cribs 10 are shown in association with a vertical section of pipe 12. Each of the cribs includes a sleeve 16 which may be an elongated relatively flat member having one surface 18 adapted to lie against the outer wall 20 of the pipe 12. The sleeve may be an elongated member and have two elongated apertures 22 (FIGS. 1 and 5) extending therethrough.

Preferably, each of the cribs is provided with two elongated members such as the rods 26 illustrated. The lower portion of each rod is slidably received in and extends through one of the apertures 22.

The upper portion 32 of each of the rods 32 is laterally offset from the lower portions and is connected to its respective lower portion by an intermediate portion 34 which is generally disposed at right angles to each of the upper and lower portions.

Lower portions 30 are pivotally mounted in the apertures 22 so that the upper portions can swing through an arc which has the lower portion 30 as its center.

As is apparent, the cross section of the sleeve is greater than the cross section of the lower portion 30 rods.

Referring now to FIG. 2, a pipe 12 which is connected by a flange joint 44 to a lower pipe section is seen to have a tracer 46 extending along its length. Typically, the tracer line carries steam. Its purpose is to assure that the material being conveyed by the pipe remains at a high enough temperature so that it is able to flow through the pipe. While the pipe illustrated uses such a tracer, it is apparent that the tracer need not be energized all the time, or that the tracer need not exist. Nevertheless, the invention is disclosed in the context where a tracer line is employed since, as will become apparent, the existence of such a line aggravates the problem mentioned above.

The cribs 10 are used to support insulation in the following manner.

At least one crib or, as illustrated in FIG. 2, two cribs 10 are placed on the outer wall of a section of vertical pipe at a convenient height. Preferably the height is such that the cribs can easily support the sections of insulation which are to be above it. The sleeve 16 is positioned so that it lies alongside the outer wall of the pipe. A first fastening means 50 which may be a wire, cable or strap is secured around the lower portion 30 of rod 26 at its juncture with intermediate portion 34. The fastener 50 may be passed underneath the tracer 46. Because the sleeve has a larger cross section than the lower portion of rod 30, fastener 50 will tend to pull the upper portion 26 of the crib toward the pipe while the lower portion 30 tends to move away from the pipe.

Additional fasteners 52 and 54 which may be comprised of the same material as fastener 50 may be wrapped around the lower portion 30 below the sleeves 16 and underneath the tracer 46 as shown. When these fasteners are drawn tight, the cribs will return to the position shown in FIG. 2 in which the upper portion 32 of each of the rods is generally parallel to the pipe. Securing the cribs to the pipe in this manner assures that they will be held tightly thereto so that they will be able to support the insulation sections.

The sections of insulation are then mounted on the cribs. Referring to FIG. 3 the two lowermost sections of insulation 60 and 62 are placed on the pipe and then permitted to slide down until they are supported by intermediate sections 34. To this extent the rods can be pivoted in the sleeves 16 so that the insulation sections 60 and 62 can be accommodated.

The upper portions 32 of the rods are then pivoted until they are in touching engagement with the outer wall 66 and 68 of each of the lower insulation sections 60 and 62.

Preferably, the outer wall 66 and 68 of each of the insulation sections 60 and 62 are then scored or grooved so that vertically disposed recesses 74 and 76 are formed. The upper portions 32 are then pivoted into the recesses 74 and 76 so that they do not extend beyond the outer wall 66 and 68 of the insulations sections. The upper portions 32 may then be secured to the lower insulation sections 60 and 62 by a suitable wrapping means such as wires 80 and 82.

Additional sections of insulation can then be placed on top of sections 60 and 62 in an alternating fashion and secured to each other and to the pipe by additional wrappers 86. While the additional sections of insulation will not be held close to the pipe and be supported against vertical movement thereby, each of the additional sections of insulation will be supported by the section below it with the lowermost sections 60 and 62 being supported by the adjustable crib.

In order to complete the insulation covering of the pipe two sections of insulation 90 and 92 can be placed below the intermediate portions 34 of the adjustable crib and held in place in a convenient fashion.

In vertical pipe installations of substantial height, cribs of the type described herein can be installed at intervals along the pipe to permit the weight of the insulation to be borne by the pipe rather than by all of the insulation sections below it.

It should be appreciated that if it becomes necessary to do work at the bottom section of the vertical pipe, as for example to install a valve or a gauge, all that need be done is to separate the lower sections 90 and 92 from the pipe to expose the surface which is to be worked. This can be done without fear that the insulation will separate near the top of the pipe or that the insulation will fall, injuring the workman. After the work is completed the insulation can be reinstalled after making any necessary adjustments in its shape.

While the invention has been described with respect to an adjustable crib of the type including a sleeve with two rods attached thereto, it is apparent that only one such rod is required in order to achieve the result described herein.

Further, while it is preferred that two adjustable cribs, each having two rods be employed in order to support a long column of insulation, it is apparent that only one such crib need be used if the upper portions of the rods can be spread far enough apart so as to be substantially diametrically opposed whereby they can support insulation on both sides of the pipe.

Thus, the scope of the invention should not be limited by the foregoing description, but rather, only by the scope of the claims appended hereto.

I claim:

1. An insulation fastening system for a pipe surrounded by a layer of insulation comprising at least one crib, said crib including a sleeve and first and second members, said sleeve lying along the outer wall of the pipe that is being insulated, each of said members including first and second portions, said first and second portions being laterally spaced from each other and being connected by a third portion, said first portions being disposed adjacent to the outer wall of said layer of insulation, means for securing said first portions to said pipe, means for securing said second portions to the outer wall of said layer of insulation, at least the second portion of each of said members being spaced from each other on said layer of insulation, and said first portion of each of said members are rotatably supported by said sleeve so that said members can be pivoted to bring said second portions adjacent the outer wall of said layer of insulation.

2. An adjustable crib for securing a layer of insulation to the outer wall of a pipe comprising a sleeve and a plurality of elongated members, said sleeve including means for rotatably supporting said members and being for lying along the outer wall of the pipe that is being insulated, a first portion of each of said members being rotatably supported by said supporting means, a second portion of each of said members being for lying along the outer wall of the layer of insulation, said first and second portions of each of said members being laterally offset with respect to each other, and a third portion of each of said members disposed between and connecting said first and second portions.

3. A device as defined in claim 2 wherein said sleeve comprises a generally elongated member with at least one flat surface for lying along the outer wall of the pipe and at least one aperture therein in which said first portions of said members can be received.

4. A device as defined in claim 2 wherein said sleeve comprises a generally elongated member with a plurality of apertures therein, and each of said first portions is received in one of said apertures.

5. A device as defined in claim 2 wherein the cross section of said sleeve is greater than the cross section of said first portion of said member so that when said sleeve lies against the pipe, said first portion is spaced therefrom.

6. An insulation fastening system for a pipe surrounded by a layer of insulation comprising at least one crib, said crib including a first member with first and second portions, said first and second portions being laterally spaced from each other and being connected by a third portion, said first portion being disposed adjacent to the outer wall of said pipe and said second portion being disposed adjacent to the outer wall of said layer of insulation, means for securing said first portion to said pipe, means for securing said second portion to the outer wall of said layer of insulation, and said means for securing said first and second portions comprises means wrapped around said first and second portions so that said portions are drawn into close engagement with said pipe and said outer wall of said layer of insulation respectively.

7. An insulation fastening system as defined in claim 6 including a sleeve disposed against said pipe with means for receiving said first portions, said first portions extending through said receiving means, and said securing means includes portions wrapped around said first members at each end of said receiving means.

8. An insulation fastening system as defined in claim 6 including recesses in the outer wall of said layer of insulation, and said second portions are received in said recesses.

9. An insulation system as defined in claim 7 wherein one of said securing members is at the juncture of said first and third portions of each of said members.

* * * * *